Jan. 24, 1939.　　　　G. SLAYTER　　　　2,144,666
VITREOUS ENAMEL
Filed Aug. 6, 1936
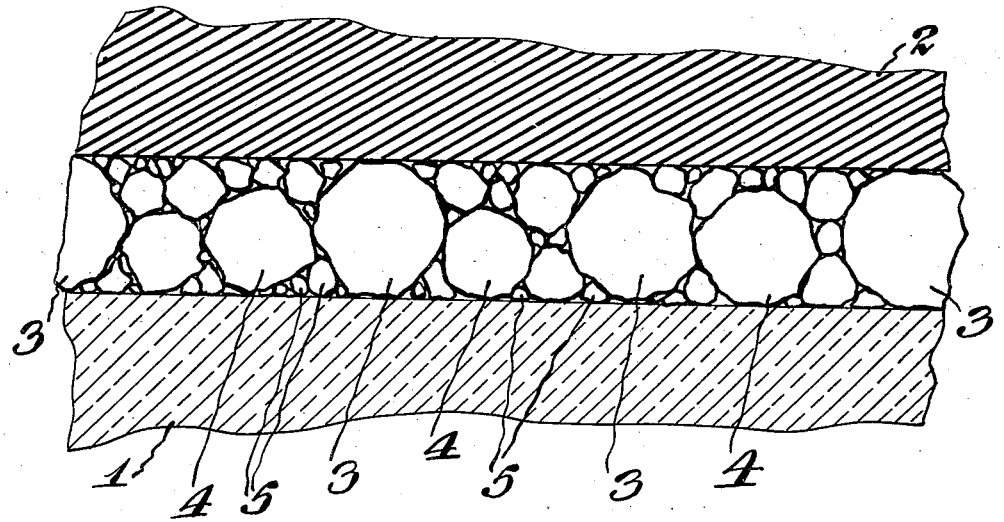
INVENTOR.
Games Slayter.
BY Rule & Hoge
ATTORNEYS.

Patented Jan. 24, 1939

2,144,666

UNITED STATES PATENT OFFICE 2,144,666

VITREOUS ENAMEL

Games Slayter, Newark, Ohio, assignor to Owens-Illinois Glass Company, a corporation of Ohio Application August 6, 1936, Serial No. 94,638

1 Claim. (Cl. 91—72)

The present invention relates to an improved vitreous enamel and more particularly to the pigment particles composing the enamel.

In the use of a vitreous enamel comprising enamel frits, quartz-like particles, metals, metal oxides and coloring materials, and carried by oily or other suitable vehicles, it has been conventional to grind the pigment down finely to a substantially uniform particle size, as for example, a size permitting all of it to pass through a 300 to 350 mesh screen.

Vitreous enamels made of such pigments have several disadvantages and shortcomings, particularly when it is attempted to apply them to bottles, jars, plates and the like by means of stamping. When applying these colors to transparent glass surfaces, it is essential that sufficient pigment is applied to the surfaces of the glass in order to produce the right depth and variations of color. A layer having a depth of from about .002" to .010" is generally required to bring out the proper depth of color. If the enamel is applied too thinly, the resultant color is pale and takes on a false hue, whereas, if the enamel is applied too thickly, the resulting color is too dark and there is also a tendency for the color to peel off. Vitreous enamels heretofore in vogue could not be applied with a predetermined and uniform depth and the enamels themselves could not be satisfactorily stamped onto the surface of the glass bottle or other transparent surface.

It is an object of the present invention to overcome the shortcomings of the prior art and to provide a vitreous enamel which may be applied either through the meshes of a screen or by means of stamping or the like.

It is another object of the present invention to provide a vitreous enamel which may be applied to a surface by means of stamping with sufficient thickness to produce the proper predetermined depth of color uniformly over the surface to be decorated.

Still another object of the present invention is to provide an enamel frit having comparatively little free interstitial space between the pigment particles, to the end that the enamel frit will contain a correspondingly large percentage of pigments in proportion to the depth; and also that there may be less free space between the pigment particles for the occlusion of oils or other carrier which must be dried or burned out before the enamel frit can be made to fuse satisfactorily onto the surface to be decorated.

Other objects and advantages of the present invention will become apparent from the following description taken in conjunction with the drawing, which is a greatly enlarged diagrammatic sectional view of a surface to be decorated and a layer of vitreous enamel thereover which is being applied by a suitable stamp.

The present invention contemplates the provision of a pigment for vitreous enamel having an aggregate of particle sizes. Heretofore it has been conventional to provide uniform particle sizes for the pigment and it was not unusual to reduce the pigment or coloring material to such a fineness that all of it could pass through a very fine mesh. When this is done, however, it will be noted that the rubber die or stamp can approach the surface to be printed to a distance approximating the thickness of particles themselves. There was nothing in the pigment which spaced the stamp and the surface to be decorated, or determined to what depth the enamel could be applied.

I have found, however, that it is possible to materially increase the depth of color application by adding a certain proportion of coarser grain particles in the coloring pigment. The larger pigment particles may be sufficiently large to extend throughout the thickness of the layer to be applied and act as spacers for the stamp and the surface to be decorated, although such large particles are not always advisable for other reasons.

I have found it desirable to grind the pigments to predetermined graduated sizes and then admix the individual graduated sizes together to produce an aggregate of pigment particles of graduated sizes. The aggregate particles may then be added to the vehicle and intermixed therewith.

As an example of the aggregate sizes of granules, it is possible to apply, say, between 5% and 30% coarser grained enamel frit or ceramic pigment having a grain size capable of passing through a 50 or 100 mesh screen and large enough to remain on a 140 mesh screen. Other relatively coarse particles which pass through the 140 mesh screen and remain on the 200 mesh screen may be added in equally small proportions. The remaining pigments and coloring material, ranging in sizes down to the smallest particles which pass through a 300 to 350 mesh screen, may be admixed to fill in the interstices left by the larger particles. The pigments are thus commingled in such a manner as to produce an aggregate of graded sizes whereby a thicker depth of enamel and also a denser pigment, in relation to the thickness of the layer, may be applied.

It has been found possible, by means of the graduated size pigments, to predetermine the depth of enamel which may be applied to a surface by means of stamping or similar application. The larger particles may be determinative of the depth of applied enamel in that they act as spacers between the surface to be decorated and the stamp, and the smaller particles, ranging down to the finest, fill in the free spaces between the largest particles. It is not necessary, however, that the largest particles be as great in size as the desired thickness of color application, nor is it necessary to use the exact proportions or sizes mentioned hereinabove, since these proportions and sizes are merely exemplary and may be varied to suit various conditions.

Referring more particularly to the drawing, reference character 1, designates a surface such as a bottle, jar, tumbler, sign, plate or the like to be decorated by a layer of vitreous enamel, which is applied by means of a rubber stamp 2. The vitreous enamel is made up of an aggregate of graduated sizes of pigment particles, and in the drawing the largest size particles 3 are actually determinative of the depth of the application and serve as spacers between the surface 1 and the stamp 2. The next smaller particles 4 serve to fill in a portion of interstitial space between the largest particles, and the remaining particles 5, ranging down to the smallest size particles, serve to fill in the interstices left by the larger particles. In this manner the pigment composing the vitreous enamel occupies a relatively larger proportion of the actual volume of the enamel to the end that a deeper shade of color may be produced by a thinner application of color than that used heretofore.

There are various suitable vehicles for the ground ceramic colors and pigments. If the design is to be painted onto the stamp or directly onto the surface to be decorated, water may be used; and, if the design is to be applied through a stencil by means of a squeegee, mixtures of water and glycerine may be mixed with the ceramic colors; or, if the design is to be directly printed onto the stamp or to the surface, a light oil, turpentine, greases, petroleum jellies, waxes, kerosene, varnishes, or other organic vehicles may be used. In each case it is generally desirable to dry out and get rid of the vehicle before firing the color. When the vehicle used is an organic substance and part of it remains in the color during firing, the design has a tendency to turn black, due to the sintering or carbonizing of the organic material.

However, certain materials may be used which do not require complete drying out or evaporation of the vehicle. For example, inorganic vehicles, such as sodium silicate may be utilized to advantage because these substances leave no carbon residue which would affect the color, but when using these substances, it is advisable to compensate in the glaze formula for the additional soda and silica thus added. In general, the amounts of soda and silica in the usual glaze formula should be reduced commensurately with the addition of sodium silicate vehicle.

With some colors that are quite refractory, such as those used for making acid-proof designs, it may be necessary to compound the color in such a way that it has a small amount of slightly fusable material which will allow the design to stick better and form a more permanent bond with the hot glass article. In order to cause preferential wetting of the glass and enable the color to free itself completely and readily from the stamp, it has been found that a coating of a very thin film of wax or oil over the stamp before applying the color thereon is beneficial.

Modifications may be resorted to within the spirit and scope of the appended claim.

I claim:

The method of decorating a surface with an enamel coating of predetermined thickness, which comprises mixing with a vehicle an aggregate of granulated ceramic pigments comprising granules of graduated sizes, the largest being of a diameter or thickness substantially equal to the said thickness of the coating, and the smaller granules being of such graduated sizes and in such proportions as to fill in the greater portion of the interstitial spaces between the larger granules and thereby form a dense mixture, and applying the mix to the said surface by a stamping implement and utilizing the said largest granules as a spacing means to space the stamping implement from the surface which is being decorated a distance about equal to the diameters of said largest granules and thereby determining the thickness of the applied coating.

GAMES SLAYTER.